June 7, 1955   W. BAENSCH   2,710,371
ELECTROCHEMICAL MOTOR

Filed Nov. 25, 1952   2 Sheets-Sheet 1

Walter Baensch
INVENTOR.

BY Hugo C. Lohner
his agent

June 7, 1955  W. BAENSCH  2,710,371
ELECTROCHEMICAL MOTOR

Filed Nov. 25, 1952 2 Sheets-Sheet 2

Walter Baensch
INVENTOR.

BY *(signature)*
his agent

United States Patent Office 2,710,371
Patented June 7, 1955

2,710,371

ELECTROCHEMICAL MOTOR

Walter Baensch, Mulheim an der Ruhr, Germany, assignor to Hugo C. Gollmer, New York, N. Y.

Application November 25, 1952, Serial No. 322,463

8 Claims. (Cl. 318—139)

The present invention relates to an electrochemical motor.

It is known that two different metals, f. i. copper and zinc, or also certain materials, f. i. carbon and zinc, when dipped into a liquid of certain properties (electrolyte) generate an electric current. One of the many uses of galvanic elements thus built is that of operating electric motors. In this case, the electric current has to be periodically switched on and off resp. pole changed by means of a commutator fastened to the axis of the armature or rotor in order to effectuate the change of poles. This, in turn, causes sparks. The advantage of an automatic change of the poles as offered by an alternating current cannot be had with current furnished by galvanic elements as these elements supply only direct current.

The present invention solves the problem of electro-chemically producing an alternating current without a commutator or slip ring as follows: Electrically positive and negative electrodes are fastened to the armature axis and directly connected through a wire or otherwise with the winding on the armature or rotor. Said electrodes are arranged and, as result of the movement of the armature, are periodically immersed into an electrolytically effective liquid (electrolyte) in such a way that the alternating current thus produced effectuates the corresponding change of the poles. It was found that the curve of the alternating current thus produced differs from the known sinusoidal curve of an alternating current generated in a dynamo in that its voltage reaches its maximum nearly instantaneously at the moment when the electrodes are dipped into the electrolyte, whereas the amperage increases and decreases in proportion to the surface of the electrodes immersed at any moment in the electrolytic liquid.

The number of periods of such an alternating current, depending upon the frequency of immersion of the electrodes into the electrolytic liquid, is naturally substantially smaller than that of a normal alternating current, and so is the voltage that depends upon the number of plus and minus electrodes and their natural voltage. This means that, as is generally the case with electrochemical processes, low voltages and high amperages will preferentially occur.

The present invention also contemplates the structure of an electrochemical motor in which the current flow is uni-directional but alternates or pulsates between a low and a high point to produce movement of the armature.

In the accompanying Figures 1 to 12 there are described several embodiments of, and their manner of operation of, a motor built in accordance with this invention; there exist, however, many modifications of this invention which to describe would far exceed the scope of this application. In the drawings, Fig. 1 represents a longitudinal section of an electrochemical motor according to the invention;

Figure 1:
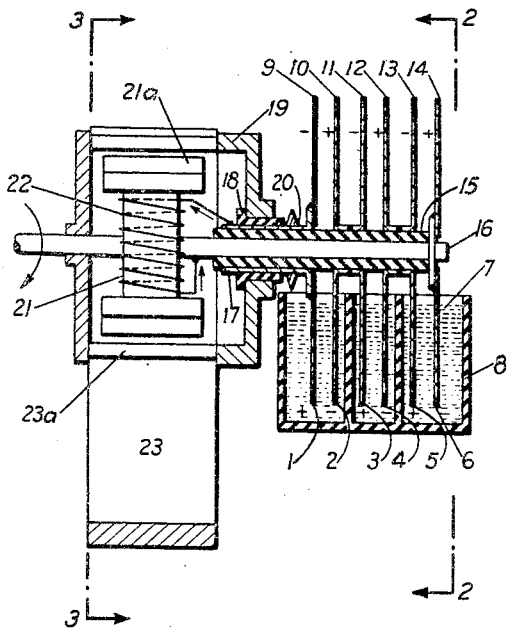
Figure 2:
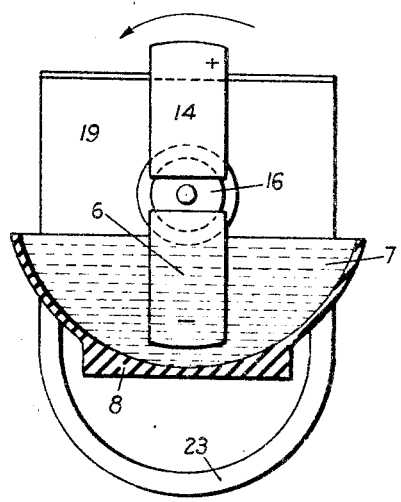
Fig. 2 is a diagrammatic sectional view from the right side of the motor shown in Fig. 1 along lines 2—2.
Figure 3:
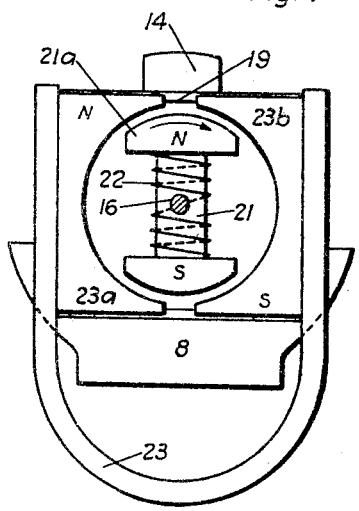
Fig. 3 is a view of the motor looking from the left in Fig. 1 along lines 3—3.

Referring now more particularly to Figs. 1 to 3 of the drawings, numerals 1, 3, and 5 represent positive, numerals 2, 4, and 6 negative electrodes which are periodically immersed in an electrolyte 7 stored in a container 8 comprising individual cells which are in series connection by having a positive and a negative electrode of adjacent cells connected with each other. A second set of negative electrodes 9, 11, and 13, and positive ones 10, 12, and 14 is arranged diametrically opposite to the electrodes 1 to 6 in such a manner that, upon immersion of electrodes 9 to 14 into the electrolyte, the current flow is reversed. The electrodes 2, 3, 4, and 5, and the electrodes 10, 11, 12, and 13 are mounted on an insulating sleeve 15 fastened on shaft 16, whereas the electrodes 6, and 14 are fastened directly to the electrically conductive shaft 16 connected with one terminal of a rotor winding 22, and the electrodes 1, and 9 are fastened to a conductive metal sleeve 17 slipped over the insulating sleeve 15 and connected to the other terminal of the rotor winding 22. The sleeve 17 is insulated by a sleeve 18 from an end shield 19. A drip-catch 20 may be fitted over sleeve 17.

An armature or rotor 21 including the winding 22 is arranged between magnet poles 23a and 23b of a permanent magnet 23. In the position illustrated in Figs. 1 to 3, the electric current flows in such a way that an upper pole 21a of the armature 21, a north pole, is repulsed by north pole 23a and attracted by south pole 23b of the field, causing a clock-wise rotation of the armature as shown in Fig. 3, until the armature is in its horizontal or neutral position (not shown) and the flow of the electric current is interrupted because the electrodes 1 to 6 will have left the electrolyte 7. Inertia, however, causes further rotation of the armature 21 and gradual immersion of the electrodes 9 to 14 into the electrolyte 7, and since the positive and negative electrodes 9 to 14 are arranged inversely to the electrodes 1 to 6, the current now flows in opposite direction. Hence, the polarity of the poles of the armature 21 changes and the armature 21 continues rotating in the well known manner as if there were a commutator such as the one used in direct current motors, or as if an alternating current were flowing through the winding 22 of the armature 21.

This invention can be technically embodied in quite a number of various forms, some of which will be described in the following.

Figures 4, 5:
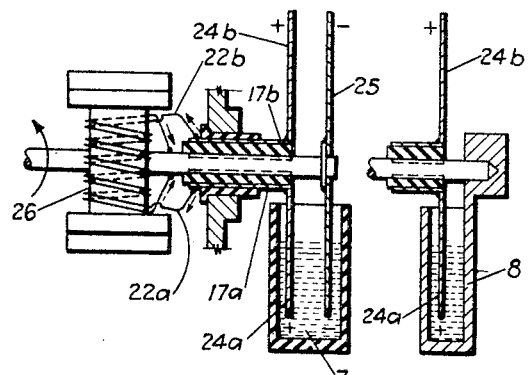
Fig. 4 is a diagrammatic longitudinal sectional view of a modified device according to the invention.
Fig. 5 is a sectional view of a portion of another modification of the device according to the invention.

For example, Fig. 4 shows electrodes 24a and 24b of equal, say positive, polarity, said electrodes being arranged in diametrically opposite positions and the conductive metal sleeve being made of two halves 17a and 17b insulated from each other. The negative electrode 25 can then be made a full disk permanently immersed in the electrolyte 7. It is clear that the disk 25 can be positive if the electrodes 24a and 24b are negative. In order to create changing polarity of the armature or rotor 26, two windings 22a and 22b connected with the shaft and the respective half-sleeve for reversal of current flow are provided on said armature so that, in the shown position, electrical current flows first in one direction through winding 22a as indicated by the full arrows, and then, with electrode 24b immersed, in the other direction through winding 22b as indicated by the dashed arrows in Fig. 4.

Another form is shown in Fig. 5 in which the container 8 of the electrolytic liquid forms the negative electrode connected with the shaft (or container 8 may also form the positive electrode if the electrodes 24a and 24b are of negatively acting material).

Figure 6:
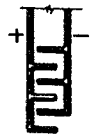
Fig. 6 shows a modification of an electrode designed to increase the amperage of the current.

In order to increase the amperage, the electrodes may preferably be shaped in such a way that the areas of their surfaces approach a maximum under given conditions, see Fig. 6.

Figure 8:
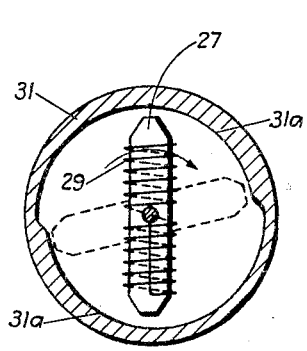
Fig. 8 is a diagrammatic cross-sectional view of the device shown in Fig. 7, taken along lines 8—8 of Fig. 7.
Figure 7:
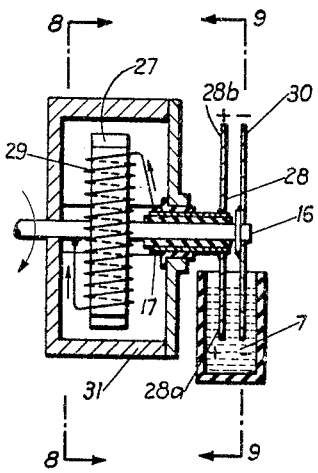
Fig. 7 is a longitudinal sectional view of still another modification of a device according to the invention.
Figure 9:
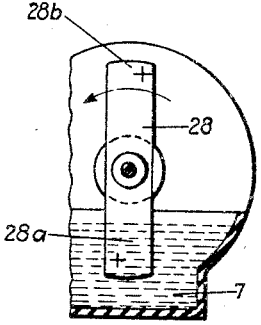
Fig. 9 is a fractional cross-sectional view of the device shown in Fig. 7, taken along lines 9—9 of Fig. 7.

It is furthermore possible to provide an electromagnet instead of the permanent magnet 23 shown in Figs. 1 to 3. It is also possible to provide a stationary field consisting of magnetic material such as iron etc., as shown in Figs. 7 to 9, instead of providing either a permanent magnet or an electromagnet. In the position of the armature 27 shown in Figs. 7 to 9, an electrical current flows from the lower part 28a of the electrode 28 through the conductive metal sleeve 17, through winding 29 on armature 27, and through shaft 16 to electrode 30 which may also be a full disk. The stationary magnetic housing 31 is curvedly designed in such a way that the armature 27, when magnetized, rotates in the direction of the arrows in Figs. 8 and 9 due to the magnetic flux through armature 27 and housing 31 as the magnetic flux lines tend to decrease the air gap between the armature 27 and the curved interior surfaces 31a of housing 31. When the armature has reached the dashed position indicated in Fig. 8, the lower part 28a of the electrode 28 (being in the same relative position as the armature 27) has just left the electrolytic liquid 7, and the armature 27, made currentless in that instant, continues to rotate through a small angle due to its inertia until the former upper part 28b of the electrode 28 dips into the liquid 7 and the armature, due to its receiving current again, is again magnetized and rotates through the other half circle.

In accordance with Figs. 1 to 9, only one pair of poles was mentioned for the armature as well as for the stationary part; it is understood, however, that several pairs of poles may be arranged and that, moreover, the armature may have three poles and the field only two.

Figures 10, 11:
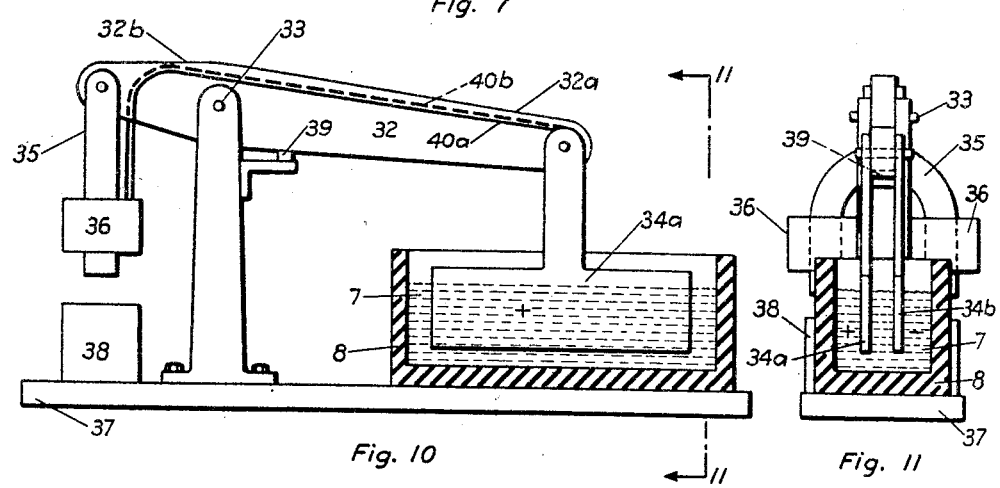
Fig. 10 is a longitudinal section of an electrochemical motor with an oscillating pivoted lever armature according to the invention.
Fig. 11 is a diagrammatic side view from the right side of the motor shown in Fig. 10 along lines 11—11.
Figure 12:
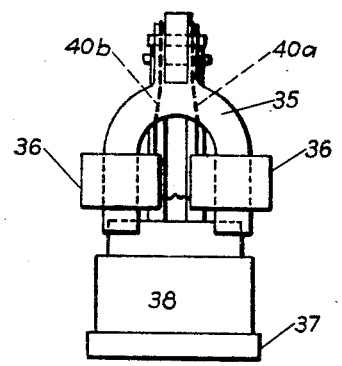
Fig. 12 is a diagrammatic side view from the left side of the motor shown in Fig. 10.

The invention of an electrochemical motor can also be embodied in a pivoting armature motor as shown in Figs. 10 to 12. A two-armed lever 32, swinging around an axis 33, carries on its longer arm 32a the electrodes 34a and 34b dipping into, and out of, the electrolytic liquid 7 in container 8, whereas its shorter arm 32b is provided with an electromagnet 35 carrying the windings 36. Below said windings there is arranged on the base plate 37 within a suitable distance a piece of iron or a permanent magnet 38. The movement of the lever 32 is limited by a stop 39 and the aforementioned piece of iron or permanent magnet 38. During the flow of the current from the positive electrode 34a through wire 40a, windings 36 and back through wire 40b to the negative electrode 34b, the shorter arm 32b of the lever 32 carrying the windings 36 is attracted by, and swings towards, the iron or permanent magnet 38, whereas the electrodes 34a and 34b carried on the longer arm 32a of the lever 32 are raised from the liquid 7. This causes the windings 36 to become currentless and therefore not any longer attracted by the piece of iron, or permanent magnet, 38. The electrodes 34a and 34b on the longer arm 32a which is made to outweigh the shorter arm 32b, will therefore again dip into the electrolytic liquid 7 and start the cycle anew. It is evident that the piece of iron or permanent magnet 38 can also be arranged on the shorter arm 32b of the lever 32 and the windings 36 on the base plate 37. It is also evident that only one electrode is needed if the container 8 is made of suitable material to serve as the other electrode.

As far as electrolytically effective water for use with this motor is concerned, it may be noted that (with the exception of distilled water) all water originating in free nature and all other watery and other liquids can be made use of as they are either acid or alkaline and furnish an electric current by electrochemical action with suitable electrodes.

The electrochemical motor of my invention can be used in apparatus for teaching physics as well as in toys, for the operation of advertising gadgets and similar purposes, and for instance also for electrically driven apparatus where it is necessary to avoid sparks and the electrical disturbances induced thereby.

Having thus described my invention, I do not desire to limit the scope thereof to the examples given and described, but I desire patent protection as my invention opens a new field in the art of electrochemical motors. While I believe the above described embodiments of my invention to be preferred embodiments, I wish it to be understood that I do not desire to be limited to the exact details of design and construction shown and described, for obvious modifications will occur to a person skilled in the art.

I claim:

1. An electrochemical motor having an electromagnetic structure including means producing a magnetic field, an armature movable with respect to said magnetic field, electrically energizable windings, and means for electrochemically producing and supplying a current to said windings periodically in accordance with the movement of said armature, said current producing and supplying means including an electrolytic liquid, positive and negative electrodes continuously connected with said windings during operation of the motor, at least one of said electrodes and said liquid being arranged for periodic separation by movement of said armature for periodically producing current when the armature moves to and from a neutral position with respect to the magnetic field.

2. An electrochemical motor having an electromagnetic structure including field poles, an armature having a shaft rotatable within said structure, electrically energizable windings on said armature, and means for electrochemically producing and supplying a current to said windings intermittently during rotation of the armature, said current producing and supplying means including an electrolytic liquid, and positive and negative electrodes electrically connected with said windings, at least two electrodes being carried by the shaft for successive immersion into the electrolytic liquid to cause a periodic reaction between positive and negative electrodes and said liquid when the armature reaches a neutral position with respect to the field poles.

3. An electrochemical motor as defined in claim 2, having two electrodes of the same polarity, one on each of opposite sides of the shaft, and wherein the windings comprise two series of windings of opposite electric characteristic, said windings being electrically connected with said electrodes and with an electrode of opposite polarity, the arrangement being such that a polar change of the armature is effected by the opposite characteristic of the windings on rotation of the armature when dipping a succeeding electrode into the electrolyte.

4. An electrochemical motor as defined in claim 2, having a plurality of rotatively successive pairs of electrodes carried by the shaft for rotation therewith, such that, upon rotation of the shaft, the sequence of positive and negative electrodes in the electrolyte is reversed by a succeeding pair of electrodes, all positive electrodes being electrically connected to one terminal of the windings and all negative electrodes to the other terminal of the windings.

5. An electrochemical motor as defined in claim 2, having two rotatively successive pairs of electrodes carried by the shaft with an unchanging sequence of positive and negative electrodes in the succeeding pair, the positive electrodes being electrically connected to one terminal of the windings and the negative electrodes to the other terminal of said windings, and including means producing a magnetic field comprising a stationary magnetic housing having an inner face surrounding the armature, said inner face being curvedly designed in such a way that the air gap decreases from a maximum to a minimum with respect to a period of rotation of the armature when a pair of electrodes enters and leaves the electrolyte.

6. An electrochemical motor having an electromagnetic structure including field poles, an armature having a shaft and electrically energizable windings, said armature being rotatable within said structure, and means for electrochemically producing and supplying a current to said windings intermittently when the armature is in a neutral position with respect to the field poles, said current producing and supplying means including an electrolytic liquid, and positive and negative electrodes electrically connected with said windings and associated with the rotatable shaft for intermittently dipping electrodes into the liquid by rotation of the shaft, the arrangement being such that with each successive reaction of positive and negative electrodes with the liquid a polar change of the armature is effected.

7. An electrochemical motor having an electromagnetic structure including means producing a magnetic field, an armature including a member mounted for swinging movement toward and away from said magnetic field, electrically energizable windings, and means for electrochemically producing and supplying a current to said windings intermittently during movement of the armature, said current producing and supplying means including an electrolytic liquid, positive and negative electrodes electrically connected with said windings, and an operating connection between the armature member and the current producing means for causing a periodic current producing reaction of the electrodes and said liquid during swinging movement of the armature member, the operating connection and the means producing a magnetic field being related to the swinging movement of the armature member in such a manner that the current producing reaction causes swinging movement of the armature member toward said magnetic field producing means, the reaction period being terminated during said swinging movement of said member and being subsequently initiated again during swinging movement away from said magnetic field.

8. An electrochemical motor having stator means including field poles, an armature mounted on a shaft for rotation with respect to said field poles, electrically energizable windings, and means for electrochemically producing and supplying a current intermittently to said windings to cause rotation of the armature, said current producing and supplying means including an electrolytic liquid, and positive and negative electrodes electrically connected with said windings and forming the terminals of a circuit completed through the electrolyte, said current producing means being mechanically associated with the rotatable shaft for periodic immersion of at least one of said electrodes into said electrolyte when the armature moves from and to a neutral position with respect to the field poles.

References Cited in the file of this patent

UNITED STATES PATENTS

| 2,669,687 | DeTastes | Feb. 16, 1954 |

FOREIGN PATENTS

| 8,958 | Great Britain | of 1841 |